United States Patent [19]

Matsuda

[11] 4,069,489
[45] Jan. 17, 1978

[54] AUTOMATIC EXPOSURE CONTROL DEVICES USING BI-DIRECTIONAL TRANSISTORS

[75] Inventor: Motonobu Matsuda, Izumi, Japan

[73] Assignee: Minolta Camera Kabushiki Kaisha, Osaka, Japan

[21] Appl. No.: 676,638

[22] Filed: Apr. 13, 1976

[30] Foreign Application Priority Data

Apr. 18, 1975 Japan .................................. 50-48047
June 12, 1975 Japan ............................ 50-80281[U]

[51] Int. Cl.² .............................................. G03B 7/08
[52] U.S. Cl. .................................................. 354/51
[58] Field of Search ................... 354/29, 51; 307/249, 307/246

[56] References Cited

U.S. PATENT DOCUMENTS 3,636,372  1/1972  Hujita et al. ..................... 307/246 X
3,794,509  8/1976  Tsuda et al. ............................ 354/51

FOREIGN PATENT DOCUMENTS 2,346,244  5/1975  Germany.

Primary Examiner—L. T. Hix
Assistant Examiner—M. L. Gellner
Attorney, Agent, or Firm—Watson, Cole, Grindle & Watson

[57] ABSTRACT

In an exposure control device, a bi-directional bi-polar transistor is connected between a light measuring circuit and a storage capacitor for connecting and disconnecting the storage capacitor from the light measuring circuit. A biasing circuit provides the bias potential to control the bi-directional bi-polar transistor either through a mechanical switch or a semiconductor.

12 Claims, 10 Drawing Figures

AUTOMATIC EXPOSURE CONTROL DEVICES USING BI-DIRECTIONAL TRANSISTORS

BACKGROUND OF THE INVENTION

The present invention relates to automatic exposure control devices for photographic cameras, and more particularly pertains to such devices wherein exposure time is controlled in accordance with a light representative signal stored in a storage device and wherein the storage device is selectively connectable to a light measuring circuit.

The automatic exposure control device of the type as mentioned above is known especially for use in through-the-lens (TTL) light measuring type cameras in which light to a photoelectric cell is interrupted while the film is exposed. However, known devices are also constructed to connect and disconnect the storage capacitor and light measuring circuit by a mechanical switch. According to recent circuit designing techniques, most electrical circuit components, with the exception of mechanical components, can be integrated in small modules. Thus, lead wires must be used to connect the integrated circuit with mechanical parts, e.g. a mechanical switch. The mechanical switch used in conventional storage type exposure control devices requires at least two wires for such a connection with the electric circuit portion, e.g. an integrated circuit module, because the mechanical switch is connected between the light measuring circuit and the storage capacitor. Furthermore, the position of the mechanical switch in the camera body is determined from the viewpoint of its mechanical operation in interlocking relationship with other mechanically operated camera components, and the mechanical switch is not always mounted near the circuit portion. Thus the wiring for the mechanical switch complicates the camera assembly, and limits the flexibility of selecting or determining the positions of the camera components for the designer.

SUMMARY OF THE INVENTION

The primary objects of the present invention is to provide storage type exposure control devices which ensure the facility of wiring the components, especially with respect to the circuit for connecting and disconnecting the storage capacitors and the light measuring circuit.

Another object of the present invention is to reduce the length of wire to be used for the assembly of the automatic exposure control device.

Still another object of the present invention is to remove the mechanical switch used only for the connection and disconnection of the storage capacitor and using for that purpose another switch which is also used for another purpose.

According to one feature of the present invention, there is provided semiconductor means having bi-directional conducting characteristics and the semiconductor means is controlled by a mechanical switch, at least one terminal of which is connectable to the power bus line of the automatic exposure control circuit.

Another feature of the invention resides in controlling the semiconductor means by a mechanical switch used for other control functions of the circuit, for example, deenergization of an electromagnet before or after shutter operation.

The semiconductor means may be a bi-directional or symmetrical bi-polar transistor, for example a TX-454 manufactured by the Sony Corporation.

The present invention is applicable to automatic exposure control circuits having two serially connected switches for the connection and disconnection of the storage capacitor, wherein one switch is operated by the shutter release operation and the other switch is manually operated independently of shutter release operation for storing an exposure control signal at any desired time.

BRIEF DESCRIPTION OF THE DRAWINGS

The above objects and features will be apparent from the following description taken in conjunction with the drawings, wherein.

DETAILED DESCRIPTION

Figure 1:
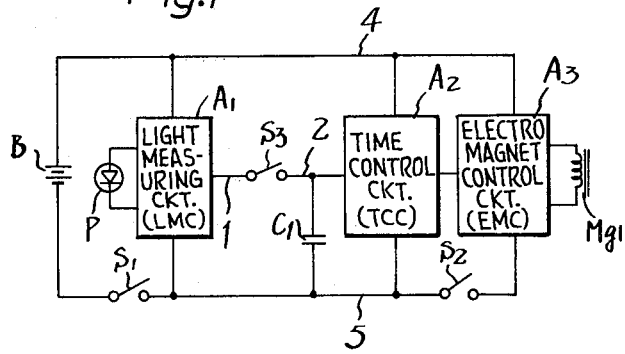
FIG. 1 illustrates a prior art automatic exposure control circuit.

FIG. 1 shows the basic construction of an automatic exposure time control circuit for a conventional single lens reflex camera of the through-the-lens (TTL) light measuring type. Battery B provides power for the control circuit. Light measuring circuit A1 includes light receptive element P, and generates a voltage signal commensurate with the brightness of an object from light passing through the objective lens and incident upon light receptive element P. Light measuring circuit A1 may contain means for incorporating into the voltage signal information indicative of unrelated light exposure factors, e.g. the film sensitivity and the preset diaphragm aperture value. First power supply switch S1 supplies power to light measuring circuit A1. Switch S1 is either manually closed prior to taking a photograph or is closed through an interlock with the shutter release button. Storage capacitor C1 stores the output signal voltage of light measuring circuit A1. Storage switch S3 is connected between one terminal 2 of storing capacitor C1 and output terminal 1 of light measuring circuit A1 and is opened immediately before the mirror starts moving in response to the shutter release operation. Time control circuit A2 controls the exposure time in accordance with the charged voltage of storage capacitor C1. For example, time control circuit A2 is constructed as shown in FIG. 2 and is referred to more fully hereinafter.

Electromagnetic control circuit A3 includes electromagnet Mg1 designed to control the restraint of a shutter closing member, a switching circuit which turns on or off when output 3 of time control circuit A2 reaches a predetermined level, and a circuit designed to energize electromagnet Mg1. Second power supply switch S2 supplies power to electromagnetic control circuit A3, and is designed to close immediately before operation of the shutter in response to the shutter release operation. Electromagnet Mg1 is usually kept energized during exposure and is deenergized by the switching operation of the aforementioned switching circuit to release the restraint of the shutter closing member, close the shutter, and thus terminate the exposure. Battery B will be unnecessarily wasted if the current flows through electromagnet Mg1 when there is no need to control the exposure. Therefore, the automatic exposure control circuit is usually designed to prevent the current from flowing through the electromagnet unless the shutter is released, even when power is supplied to light measuring circuit A1 by second power supply switch S2.

Figure 2:
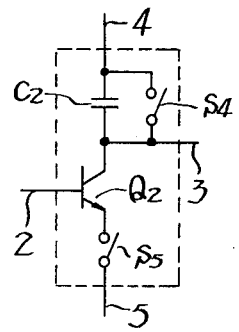
FIG. 2 shows a prior art time control circuit used in the circuit of FIG. 1.

With regard to the circuit in FIG. 2, Q2 is a logarithmic extension transistor which generates at its collector a current proportional to the antilogarithm of the voltage applied between the base and the emitter of the transistor. Timing capacitor C2 integrates the collector current of transistor Q2. Discharge switch S4 short-circuits timing capacitor C2 and discharges it following the completion of exposure. Discharge switch S4 opens immediately before, or simultaneously with, shutter opening in response to the shutter release operation. Switch S5 is closed simultaneously with the opening of the shutter.

In the automatic exposure time control circuit of a conventional single lens reflex camera of the TTL light measuring type, it is understood from the foregoing explanation that there are as many as four switches which should be operated in conjunction with the shutter release operation. Besides, such switch operations are not necessarily timed coincidentally, and the need of placing them in a limited space makes their wiring, positioning and construction quite complicated and entails dexterous labor in assembling and adjusting them.

Figure 3:
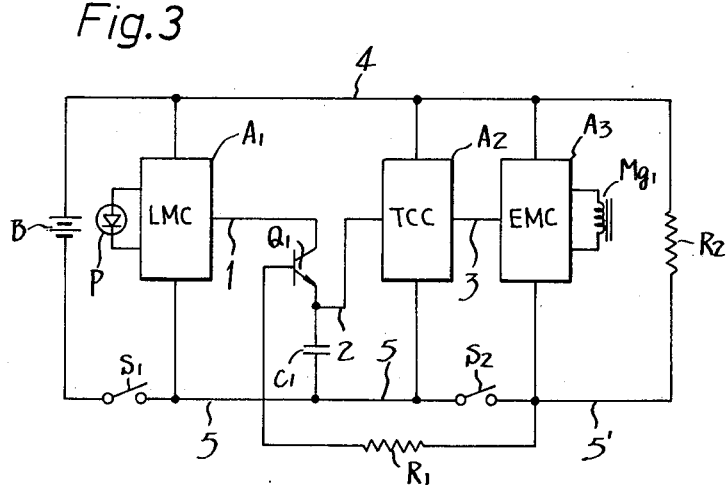
FIG. 3 illustrates the first embodiment of an automatic exposure control circuit in accordance with the invention.

Throughout the description the same elements in each of the Figures have the same numerical designation. In the first embodiment of the invention shown in FIG. 3, bi-polar transistor Q1 has its base connected to terminal 5' via base bias resistor R1 and is a symmetrical transistor which conducts current bi-directionally, i.e., from the collector to the emitter and vice versa, when the base is normal biased. The collector and the emitter of transistor Q1 are connected between output 1 of light measuring circuit A1 and terminal 2 of storage capacitor C1. As referred to hereinafter, R2 is a resistance which provides a current path for biasing the base of transistor Q1 normally when switch S2 is open. In a practical embodiment, resistance R2 consists of the internal resistance of time control circuit A2. The operation of switch B2 is timed coincidentally with that of switch S3 in the circuit of FIG. 1, i.e., switch S2 is closed prior to the start of the movement of the mirror. Switch 2 of FIG. 1 may also be closed during the mirror movement.

Assuming that first power supply switch S1 is closed and second power supply switch S2 is opened, then a signal voltage is generated at the output terminal 1 of light measuring circuit A1. However, as the base of transistor Q1 is biased in the normal direction via resistors R1 and R2, the collector-emitter of transistor Q is conductive and the signal voltage from light measuring circuit A1 is impressed on storage capacitor C1 via transistor Q1. When the signal voltage level of light measuring circuit A1 becomes lower than the voltage of capacitor C1, the charge will move from the emitter side to the collector side of transistor Q1 until the charge level of the collector and emitter of transistor Q1 are the same. This sort of phenomena is possible with an ordinary transistor if its response can be discharged. However, prompt response is necessary to store information of the brightness of the object. So far as response is concerned, the symmetrical transistor causes no problem at all as is evident from the following explanation. Since the DC current amplifying rate $H_{FE}$ of the symmetrical transistor is made far greater than that of the ordinary transistor in both directions in the saturated region of the operating characteristic, and thereby the internal resistance of the symmetrical transistor is much smaller, its resistance component can be disregarded with respect to its response characteristics.

Figure 6:
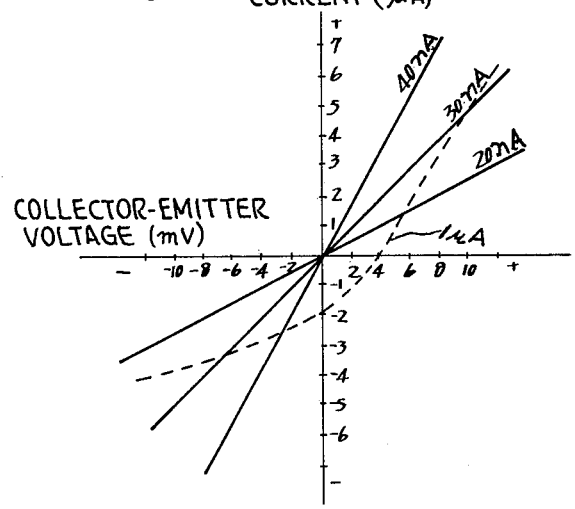
FIG. 6 shows the collector current vs the collector-emitter voltage characteristics for a bi-directional transistor and a normal transistor.

FIG. 6 shows an example of the characteristics of symmetrical transistors. When a symmetrical transistor having the characteristics as shown in FIG. 6 is used, about 20nA is sufficient for the base current. The dotted line represents the base current characteristics of an ordinary transistor and the solid lines identified by 20nA, 30nA and 40nA are the base current characteristics of bi-directional transistor type TX-454 manufactured by the Sony Corporation. The base current, in the stable state, flows from the collector to output 1 of the light measuring circuit. As a result, the potential at output 1 increases by $R_0 \cdot I_B$ wherein $I_B$ is the base current and $R_0$ is the output resistance of the light measuring circuit and such increase of potential produces an error in exposure. If the value of $R_0 \cdot I_B$ is negligibly small, the error can be disregarded. However, when a reduction of the influence of the base current is desired, a resistor having resistance value substantially larger than the output resistance may be connected in parallel with the output resistance of the light measuring circuit so that electric current of an amount corresponding to that of the base current flows through the resistor and the supply of base-current to the light measuring circuit is avoided.

When second power supply switch S2 is closed in response to the shutter release operation, power continues to be supplied to light measuring circuit A1 but the potential at the base of transistor Q1 becomes a minimum to back-bias transistor Q1 so that it is blocked to disconnect storage capacitor C1 from light measuring circuit A1. Consequently, variations in the output of light measuring circuit A1 caused by the movement of the mirror, etc., will not be transmitted to the capacitor C1. When second power supply switch S2 is opened again upon the completion of exposure, transistor Q1 becomes conductive, and the signal voltage from light measuring circuit A1 is again impressed on storage capacitor C1.

Figure 4:
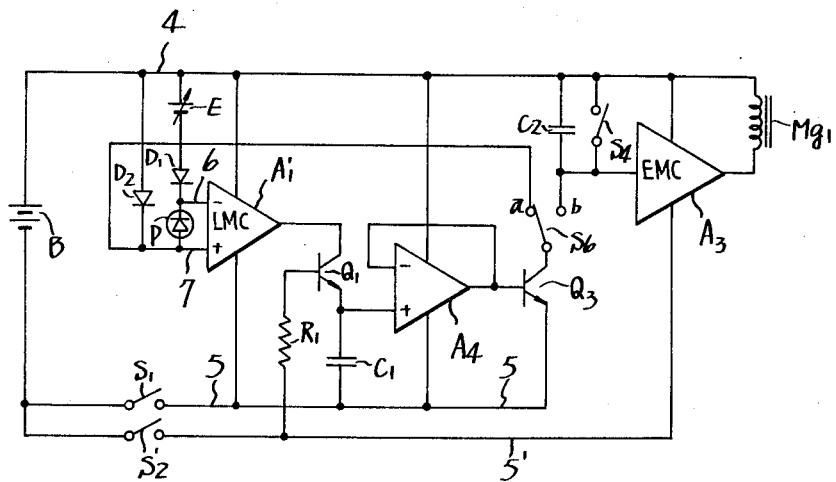
FIG. 4 shows the second embodiment of an automatic exposure control circuit in accordance with the invention.

The second embodiment of the invention shown in FIG. 4 is constructed such that a current proportional to the object brightness detected by light measuring element P may be retained even when the light incident thereon is shut off for film exposure, and also so that the current may be supplied to an integrating capacitor to control the exposure time. A'1 and A4 are operational amplifiers. To obtain the short-circuited current from photodiode P, which is connected between the input terminals of operational amplifier A'1, a negative feedback circuit is formed via switch S6 between one input terminal of the amplifier A'1 and the collector of transistor Q3, which provides an output of the light measuring circuit. Storage capacitor C1 is connected between operational amplifiers A'1 and A4, and the latter operates as an impedance conversion circuit. Between the operational amplifiers A'1 and the storage capacitor C1 is connected a bi-directional transistor Q1 which functions substantially in the same manner as the transistor Q1 in FIG. 3.

When power is supplied to the light measuring circuit following the closure of first power supply switch S1, a photocurrent Ip proportional to the intensity of light incident on photodiode P is generated and flows toward the collector of transistor Q3. Photocurrent Ip is designed to flow from positive terminal 4 of power supply battery B via diode D1 and voltage source E to provide a signal for unrelated light exposure factors. The voltage between terminals 4 and 7 is equal to the sum of the voltage across diode D1, the logarithm of photocurrent Ip and voltage Y of the voltage source E. The summed voltage appears across diode D2. As a result, the current flowing through the negative feedback circuit incorporates information commensurate with the film sensitivity, and at the same time is a greatly amplified photocurrent Ip. Therefore, it is easy for the successive circuits to process the feedback current. In this circuit, storage capacitor C1 functions to retain the collector current of transistor Q1. That is, when second power supply switch S'2 is closed to turn off transistor Q1, the same current as that flowing upon the measurement of light flows through the collector of transistor Q3, because the charge stored in capacitor C1 is maintained. Consequently, the exposure time can be determined in accordance with that stored charge.

Figure 5:
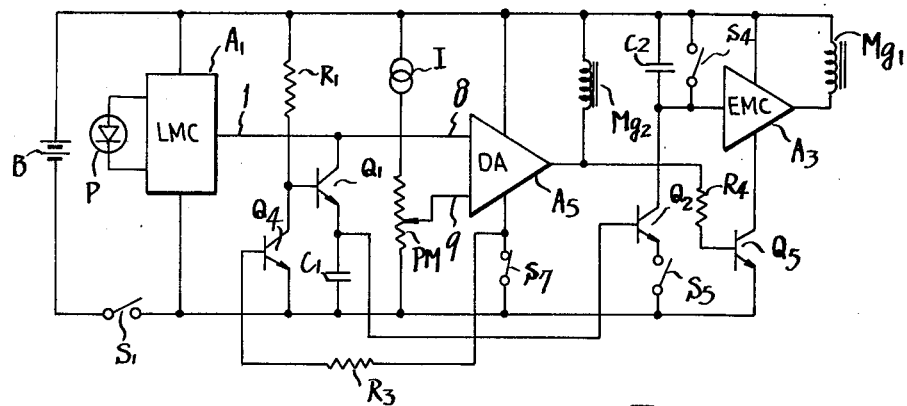
FIG. 5 illustrates the third embodiment of an automatic exposure control circuit in accordance with the invention.

The third embodiment of the invention is shown in FIG. 5 and the circuit thereof automatically determines the proper diaphragm aperture with the exposure time manually set previously and then ultimately controls the exposure time according to the output signal commensurate with the brightness of the object measured through the prior automatically determined diaphragm aperture. Thus the exposure is accurate even if the aperture is inaccurately determined for the manually set exposure time, and a large range of object brightness can be covered by the change of exposure time when either the maximum or minimum diaphragm aperture does not provide proper exposure for a set exposure time. In the diaphragm of the circuit, light measuring circuit A1 includes means for incorporating information commensurate with the film sensitivity, and generates a voltage signal output 1 proportional to the logarithm of intensity of light from an object passing through the object lens and the aperture, or a voltage signal output proportional to the Tv value (in the APEX notation). At the outset, while switch S7 is closed, transistor Q4 is non-conductive, so that bi-directional transistor Q1 is conductive and signal output 1 of light measuring circuit A1 is provided to storage capacitor C1 substantially in the same manner as is done in the circuit of FIGS. 3 or 4. The light measuring circuit output 1 is also provided to one input terminal 8 of driving circuit A5 of electromagnet Mg2 for determining the diaphragm aperture. Driving circuit A5 is a differential amplifier circuit, and to input terminal 9 thereof is applied a voltage signal proportional to the preset exposure time as set by potentiometer PM. I is a constant current circuit.

As the aperture is stopped-down from its fully open position in response to the shutter release operation, the voltage level of output 1 becomes lower. When that voltage level becomes lower than the predetermined voltage level set by potentiometer PM, driving circuit A5 turns off to deenergize electromagnet Mg2, so that the aperture setting member is stopped and locked to the determined diaphragm aperture. However, since switch S7 is designed to open at the end of the aperture setting process when the diaphragm stopping-down operation is completed, transistor Q4 becomes conductive to block transistor Q1, and the output of light measuring circuit A1 as determined with the stopped-down diaphragm aperture is stored by storage capacitor C1. In the case where switching circuit A5 does not turn off because of the object brightness, even with the diaphragm stopped-down to the minimum aperture, switch S7 is opened to deenergize electromagnet Mg2 to make transistor Q5 conductive to energize electromagnet Mg1. Subsequently, exposure will be made for the length of time according to the voltage stored by storage capacitor C1 in the same way as described for the circuit shown in FIG. 1. In the circuit of FIG. 5, transistor Q4 is not controlled by a second power supply switch as was done in the circuit shown in FIGS. 3 and 4. In other words, any switch arrangement can be used if nothing disturbs the timing of deactuating transistor Q1.

Figure 7:
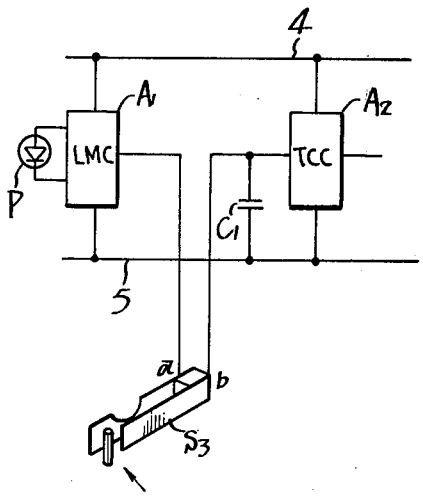
FIG. 7 illustrates the prior art connection of a mechanical switch between a light measuring circuit and a storage capacitor.
Figure 8:
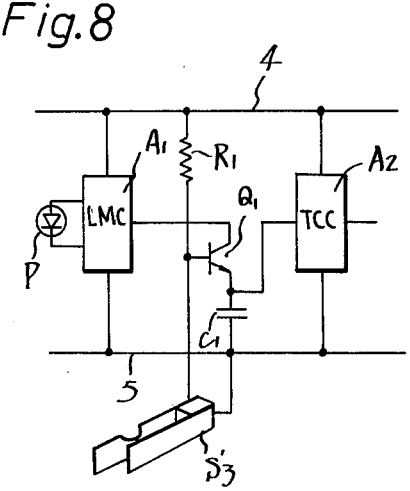
FIG. 8 shows the interconnection of a mechanical storage control switch between a power bus line and a bi-directional storage control transistor in accordance with the invention.

Furthermore, it is effective to replace the mechanical storage switch with a transistor even if the number of switches is not decreased. Since terminal $a$ or $b$ of storage switch S3 is not directly connected either with power supply bus 4 or with power supply bus 5 as shown in FIG. 7, it is necessary to prepare two lead wires from the circuit arrangement to the point where switch S3 is installed. If symmetrical or bi-directional transistor Q1 is set in place of the mechanical storage switch and if it is controlled by switch S'3 as shown in FIG. 8, one terminal of switch S'3 can be connected to the nearest point of the bus line because at least one of bus lines 4, 5 is usually extended to various parts of the camera mechanism. Consequently, only one lead wire is sufficient to connect the body of the control circit with switch S'3, thereby enhancing the designing and assembling of the whole camera.

Figure 9:
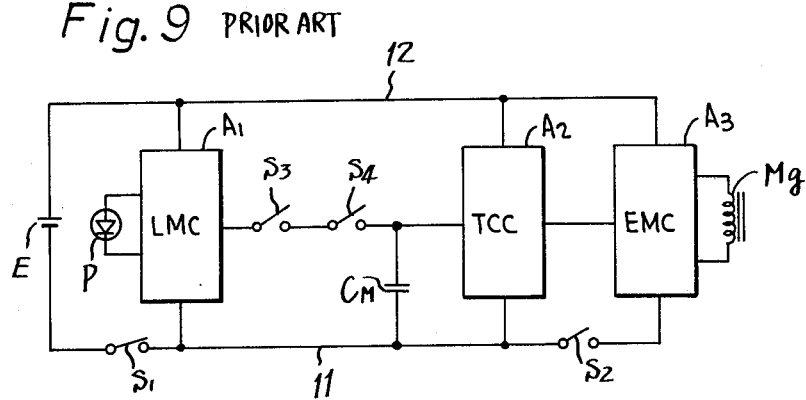
FIG. 9 shows a prior art automatic exposure control circuit using series connected switches between the light measuring circuit and the storage capacitor.
Figure 10:
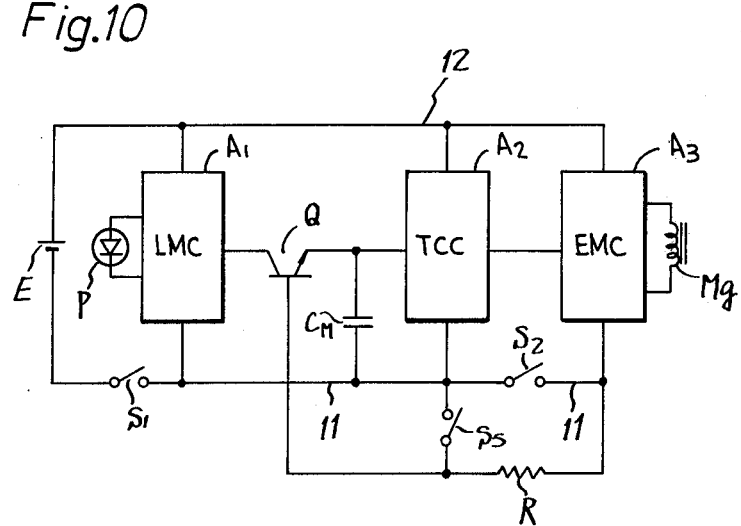
FIG. 10 illustrates an application of the invention to the prior art circuit of FIG. 9.

FIG. 10 shows another application of this invention to a circuit having two switches for separating the storage capacitor from the light measuring circuit and operated by separate operating mechanisms, respectively. FIG. 9 shows the conventional circuit construction, wherein light measuring circuit A1 includes light receptive element P for receiving light from the object through the camera objective lens and which generates a voltage signal commensurate with the brightness of the object. The light measuring circuit may sometimes include means for incorporating in its output information commensurate with the film sensitivity and the preset diaphragm aperture. Otherwise, such information may be introduced into other parts of the circuit. The output terminal of light measuring circuit A1 is connected to storage capacitor Cm via switches S3 and S4 to charge it with the light measuring circuit output. Either switch S3 or S4 is a first memory switch opened in conjunction with the shutter release operation. The other switch is a second memory switch which is normally closed and which can be optionally opened by the photographer during the measurement of light to retain in memory capacitor Cm the light measurement output so that the exposure time is controlled in accordance with the information thus retained. Timing circuit A2 controls the shutter closure in accordance with the voltage stored in memory capacitor Cm. This circuit consists of, for example, a transistor and an integrating capacitor which integrates the collector current of the transistor commensurate with the voltage stored in the memory capacitor Cm and applied between the base and emitter of the transistor. Electromagnet controlling circuit A3 switches its output when the output level of timing circuit A2 reached a predetermined value, and deenergizes electromagnet Mg connected to the output of circuit A3 to close the shutter. First power supply switch S1 connects power to light measuring circuit A1, while second power supply switch S2 controls electromagnet controlling circuit A3. Switch S2 is kept open during light measurement and is closed to energize electromagnet Mg immediately before actuation of the shutter in response to the shutter release operation.

Since the conventional construction has two memory switches S3 and S4 connected in series with each other, the wiring for the circuits within the camera body is very complicated, because light measuring circuit A1 and timing control circuit A2 are not necessarily installed close to switches S3 and S4. Thus a great deal of work is required to connect the aforementioned circuits and switches in the limited space of the camera.

FIG. 10 shows an application of this invention to the prior art circuit shown in FIG. 9. Transistor Q, connected between the output of light measuring circuit A1 and one terminal of memory capacitor Cm, is a symmetrical or bi-directional bi-polar transistor having a special characteristic that enables current to flow easily bi-directionally from the collector to the emitter in the manner as explained in detail with respect to FIG. 3, and which functions in the circuit as described above with respect to switches S3, S4 in FIG. 9. Resistor R has one terminal connected to the base of transistor Q and is designed not only to limit the base current of transistor Q, but also keeps electromagnet control circuit A3 inoperative when switch S2 is kept open and switch S5 is closed. Switch S5 is connected between the base of transistor Q and power supply bus 11 and is normally kept open, but it can be manually closed at the discretion of the camera operator. Memory capacitor Cm stores and retains the light measuring output at the time when switch S5 is closed. In such a circuit, switch S1 is kept closed and switch S2 kept open during the measurement of light. In this condition, transistor Q is made conductive as the base current flows from power source E via power supply bus 12, the resistant component of electromagnet control circuit A3 and resistor R, which has a very high resistance, e.g. in the order of megohms. Consequently, memory capacitor Cm is charged with the output voltage of light measuring circuit A1. When second power supply switch S2 is closed in conjunction with the shutter release operation, the potential at the base of transistor Q becomes equal to that at power supply bus 11, and then no current flows through transistor Q. As a result, light measuring circuit A1 is disconnected from capacitor Cm, and the voltage charged by capacitor Cm is retained. Then the well-known exposure controlling operation is carried out according to the stored voltage.

When switch S5 is closed during the measurement of light, no current flows through transistor Q, and capacitor Cm retains the light measuring output at the time when switch S5 is closed. The closure of switch S5 does not cause electromagnet controlling circuit A3 to operate due to the high resistance value of resistor R.

In the above type of circuit construction, one terminal of switch S5 may be connected only to power supply bus 11, so that its connection point may be selected at a number of points within the camera. Thereby, the wiring is facilitated to simplify the assembly of the camera, and the connection of both terminals of switch S2 with the power supply bus is easily and readily accomplished.

What is claimed is:

1. An automatic exposure control circuit for a photographic camera including a light measuring circuit for generating an output signal representative of scene brightness, a storage capacitor for storing the output signal, and an electric timing circuit for controlling exposure time through exposure terminating means in accordance with the stored output signal, comprising:
   at least one mechanical switch operated in association with the camera shutter releasing operation;
   a bi-directional bi-polar transistor including a collector and emitter connected between said light measuring circuit and said storage capacitor, said bi-directional transistor further including a base and having the capability of conducting current from the collector to the emitter thereof and vice versa when bias potential is applied to said base;
   a biasing circuit for generating said bias potential and connected to said at least one mechanical switch and said base, whereby the application of said bias potential is controlled by said at least one mechanical switch, said biasing circuit includes semiconductor switching means for controlling the application of bias potential to the base of said bi-directional transistor, said semiconductor switching means being controlled by said at least one mechanical switch; and
   a power source and a pair of power busses respectively connected to each terminal of said power source, and said biasing circuit further includes a bias resistor serially connected with the emitter-collector of said semiconductor switching means between said pair of power busses, and said base of said bi-directional transistor being connected to the junction of said bias resistor and the collector of said semiconductor switching means.

2. An automatic exposure control circuit as in claim 1 wherein said semiconductor switching means includes a transistor having a base and a second biasing circuit for connecting said base to said mechanical switch.

3. An automatic exposure control circuit as in claim 2 wherein at least one terminal of said mechanical switch is connected to either one of said pair of power busses and the other terminal is connected to said second biasing circuit.

4. An automatic exposure control circuit for a photographic camera including a light measuring circuit for generating an output signal representative of scene brightness, a storage capacitor for storing the output signal, and an electric timing circuit for controlling exposure time through exposure terminating means in accordance with the stored output signal, comprising:
- at least one mechanical switch operated in association with the camera shutter releasing operation;
- a bi-directional bi-polar transistor including a collector and emitter connected between said light measuring circuit and said storage capacitor, said bi-directional transistor further including a base and having the capability of conducting current from the collector to the emitter thereof and vice versa when bias potential is applied to said base;
- a biasing circuit for generating said bias potential and connected to said at least one mechanical switch and said base, whereby the application of said bias potential is controlled by said at least one mechanical switch; and
- an electric power source and at least one power bus for connecting one terminal of said power source to said light measuring circuit, said storage capacitor, said electric timing circuit and exposure terminating means, and wherein said biasing circuit includes a bias resistor connected between said base and said power bus, said at least one mechanical switch being connected between said one terminal of said power source and a junction point at which said bias resistor is connected with said power bus.

5. An automatic exposure control circuit as in claim 4, wherein said at least one mechanical switch is connected between said power source and said means for terminating exposure.

6. An automatic exposure control circuit as in claim 5, wherein said at least one mechanical switch is connected in said at least one power bus.

7. An automatic exposure control circuit as in claim 4 further comprising a second mechanical switch manually operable independently of camera operation, said second mechanical switch being connected across the series connection of said at least one mechanical switch and said bias resistor, whereby with said second mechanical switch closed the bias potential is eliminated to make said bi-directional transistor non-conductive with said at least one mechanical switch either open or closed.

8. An automatic exposure control circuit as in claim 4 further comprising an electric power source and a first power bus for connecting one terminal of said power source to said light measuring circuit, said storage capacitor, said electric timing circuit and exposure terminating means, and further comprising a second power bus connected to the other terminal of said power source, and wherein said biasing circuit includes a bias resistor connected between said second power bus and said base of said bi-directional transistor, and said at least one mechanical switch is connected between said first power bus and the junction of said bias resistor and said base.

9. An automatic exposure control circuit for a photographic camera including a light measuring circuit for generating an output signal representative of scene brightness, a storage capacitor for storing the output signal, and an electric timing circuit for controlling exposure time through exposure terminating means in accordance with the stored output signal, comprising:
- at least one mechanical switch operated in association with the camera shutter releasing operation;
- a bi-directional bi-polar transistor including a collector and emitter connected between said light measuring circuit and said storage capacitor, said bi-directional transistor further including a base and having the capability of conducting current from the collector to the emitter thereof and vice versa when bias potential is applied to said base;
- a biasing circuit for generating said bias potential and connected to said at least one mechanical switch and said base, whereby the application of said base potential is controlled by said at least one mechanical switch, said biasing circuit includes semiconductor switching means for controlling the application of bias potential to the base of said bi-directional transistor, said semiconductor switching means being controlled by said at least one mechanical switch; and
- an automatic diaphragm control circuit for controlling the diaphragm aperture in accordance with said output signal and a power source, and wherein said at least one mechanical switch is connected between one terminal of said power source and said automatic diaphragm control circuit, and said biasing circuit is connected between the base of said semiconductor means and the junction of said at least one mechanical switch and said automatic diaphragm control circuit.

10. An automatic exposure control circuit as in claim 9 wherein said biasing circuit includes a bias transistor and a bias resistor serially connected between the terminals of said power source to turn off said bias transistor and turn on said bi-directional transistor when said at least one mechanical switch is opened.

11. An automatic exposure control circuit for a photographic camera including a light measuring circuit for generating an output signal representative of scene brightness, a storage capacitor for storing the output signal, and an electric timing circuit for controlling exposure time through exposure terminating means in accordance with the stored output signal, comprising:
- at least one mechanical switch operated in association with the camera shutter releasing operation;
- a bi-directional bi-polar transistor including a collector and emitter connected between said light measuring circuit and said storage capacitor, said bi-directional transistor further including a base and having the capability of conducting current from the collector to the emitter thereof and vice versa when bias potential is applied to said base; and
- an impedance conversion circuit connected between said storage capacitor and said electric timing circuit for generating electric current commensurate with the scene brightness at its output, and wherein said light measuring circuit includes an operational amplifier and a photodiode connected between a pair of input terminals of said operational amplifier, the output of said impedance conversion circuit being connectable to one of said pair of input terminals to feedback the output of said impedance conversion circuit to said light measuring circuit, and means for selectively connecting the output of said impedance conversion circuit to either said operational amplifier or said electric timing circuit.

12. An automatic exposure control circuit as in claim 11 further comprising a power source and wherein said at least one mechanical switch is connected between said power source and said electric timing circuit, said biasing circuit includes a bias resistor having a pair of terminals, one of said terminals being connected to said base of said bi-directional transistor and the other of said terminals being connected between said at least one mechanical switch and said electric timing circuit.

* * * * *